(12) United States Patent
Mansouri Rad et al.

(10) Patent No.: US 10,965,370 B2
(45) Date of Patent: Mar. 30, 2021

(54) OPTICAL PERFORMANCE MONITOR

(71) Applicants: Mohammad Mehdi Mansouri Rad, Kanata (CA); Patrick Dumais, Ottawa (CA); Trevor James Hall, Ottawa (CA); Mehedi Hasan, Nepean (CA)

(72) Inventors: Mohammad Mehdi Mansouri Rad, Kanata (CA); Patrick Dumais, Ottawa (CA); Trevor James Hall, Ottawa (CA); Mehedi Hasan, Nepean (CA)

(73) Assignees: Huawei Technologies Canada Co., Ltd., Kanata (CA); The University of Ottawa, Ottawa (CA)

( * ) Notice: Subject to any disclaimer, the term of this patent is extended or adjusted under 35 U.S.C. 154(b) by 0 days.

(21) Appl. No.: 16/889,572

(22) Filed: Jun. 1, 2020

(65) Prior Publication Data

US 2020/0412447 A1 Dec. 31, 2020

Related U.S. Application Data

(60) Provisional application No. 62/868,450, filed on Jun. 28, 2019.

(51) Int. Cl.
*H04B 10/08* (2006.01)
*H04B 10/079* (2013.01)

(52) U.S. Cl.
CPC ............... *H04B 10/0795* (2013.01)

(58) Field of Classification Search
CPC .......... H04B 10/0795; H04B 10/07953; H04B 10/07955; H04B 10/07957; H04B 10/0775; H04B 10/61; H04J 14/02

USPC .... 398/33, 34, 38, 79, 45, 48, 49, 202, 208, 398/209, 85, 87, 82, 25, 26, 27, 158, 159; 385/24, 37, 27, 14
See application file for complete search history.

(56) References Cited

U.S. PATENT DOCUMENTS 6,344,910 B1 * 2/2002 Cao ...................... H04B 10/077
398/212
7,130,505 B2 * 10/2006 Shen ................... G02B 6/12019
385/24

(Continued)

OTHER PUBLICATIONS

Dana Seyringer et al "Technological verification of size.optimized 160.channel silicon nitride.based AWG.spectrometer for medical applications"; Applied Physics B (2019).

(Continued)

*Primary Examiner* — Hanh Phan

(57) ABSTRACT

An optical performance monitor comprises a first stage configured to receive a multiplexed optical signal. The first stage is tunable over a period. The first stage periodically filters the multiplexed optical signal over an optical channel to produce a fine filtered optical signal. A second stage is coupled to the first stage and has a second-stage transfer function. The second stage receives the fine filtered optical signal and produces one or a plurality of interfered optical signal pairs. A third stage is coupled to the second stage and has a third-stage transfer function. The third stage receives the optical signal pairs and demultiplexes the optical signal pairs to produce a plurality of demultiplexed optical signals. The combination of the second-stage transfer function and the third-stage transfer function is flatter over the optical channel than the third-stage transfer function.

27 Claims, 12 Drawing Sheets

(56) References Cited

U.S. PATENT DOCUMENTS

| | | | | |
|---|---|---|---|---|
| 2004/0096151 A1* | 5/2004 | Svilans | ............... | G01J 3/12 385/27 |
| 2005/0031259 A1* | 2/2005 | Shen | ............ | H04B 10/0795 385/24 |
| 2017/0093486 A1 | 3/2017 | Rad et al. | | |

OTHER PUBLICATIONS

Bernardo B. C. Kyotoku, et al "Sub-nm resolution cavity enhanced microspectrometer" Optics Express 2009.

Chao Xiang et al, "Widely Tunable Si3N4 Tripple-Ring and Quad-Ring resonator Laser Reflectors and Filters", Group Four Photonics (GFP), 2018.

Yu Li et al "under On-chip photonic microsystem for optical signal processing based on silicon and silicon nitride Platforms"; Adv. Opt. Tech. 2018.

Thomas Kamalakis et al, "An Efficient Technique for the Design of an Arrayed-Waveguide Grating With Flat Spectral Response", Journal of Lightwave Technology, 2001.

Koichi Maro et al Modeling of Multi-Input Arrayed Waveguide Grating and Its Application to Design of Flat-Passband Response Using Cascaded Mach—Zehnder Interferometers, in Journal of Lightwave Technology, 2007.

Derek Kita et al on "On-Chip Infrared Spectroscopic Sensing: Redefining the Benefits of Scaling", JSEQE 2017.

Yurtsever (Baets) 2011 16 Annual Symposium IEEE Photonics Benelux Chapter MRR AWG SOI spectrometer.

Kiyo Ishii et al "Formulation of MUXIDEMUX Functions for Multiple Input-Output Port Cyclic AWG" in ACP technical digest 2012 OSA Paper AS4A.4.

Bey-Chi Lin "Generalization of an Optical ASA Switch"; Applied Sciences, MDPI, Mar. 15, 2019.

C. R. Doerr et al "Low-Loss Rectangular-Passband Multiplexer Consisting of a Waveguide Grating Router Synchronized to a Three-Arm Interferometer"; IEEE Photonics Technology Letters, vol. 17, No. 11, Nov. 2005.

Aitor V. Velasco et al "High-resolution Fourier-transform spectrometer chip with microphotonic silicon spiral waveguides"; Optics Letters / vol. 38, No. 5 / Mar. 1, 2013.

Wim Bogaerts et al "Silicon microring resonators"; Laser Photonics Rev. 6, No. 1, 47-73 (2012).

A chapter of book "Wavelength Filters in Fibre Optics"; edited by Herbert Venghaus; Springer, Berlin, Heidelberg; 2006.

Zheng, S.N. et al., "Microring resonator-assisted Fourier transform spectrometer with enhanced resolution and large bandwidth in single chip solution", Nature Communications, vol. 10, issue 1, article No. 2349, May 28, 2019. Downloaded on Sep. 3, 2020 and available from https://www.nature.com/articles/s41467-019-10282-1.pdf.

Akca, I. et al., "Broad-spectral-range synchronized flat-top arrayed-waveguide grating applied in a 225-channel cascaded spectrometer", Optics Express, vol. 20, Issue 16, Jul. 25, 2012. Downloaded on Sep. 3, 2020 and available from www.researchgate.net/publication/232087846_Broad-spectral-range_synchronized_flat-top_arrayed-waveguide_grating_applied_in_a_225-channel_cascaded_spectrometer.

Ruocco, A. et al., "Microring Resonator Refractive Index Sensor with Integrated Spectrometer", 2015 IEEE International Conference on Group IV Photonics, pp. 147-148. Downloaded on Sep. 3, 2020 and available from https://biblio.ugent.be/publication/7196860/file/7196863.pdf.

Jun Zou et al., "Temperature Self-Compensated Optical Waveguide Biosensor Based on Cascade of Ring Resonator and Arrayed Waveguide Grating Spectrometer", Journal of Lightwave Technology, vol. 34, No. 21, Nov. 1, 2016, pp. 4856-4863.

\* cited by examiner

OPTICAL PERFORMANCE MONITOR

CROSS REFERENCE TO RELATED APPLICATIONS

This application claims priority to U.S. provisional patent application Ser. No. 62/868,450 filed Jun. 28, 2019, the contents of which are incorporated herein by reference.

FIELD OF THE INVENTION

The present invention generally pertains to the field of optical communication networks, and particular embodiments or aspects that relate to the monitoring of the performance of an optical signal.

BACKGROUND

Optical performance monitoring (OPM) is an important necessity in optical networks. Network management agents or optimization algorithms need up to date performance data for the network links, components and operating points of service (WDM traffic channels in case of transport optics). Monitoring information can be used for better resource optimization to maximize the reach vs rate. OPM information also can be used for performance prediction and planning in case of network reconfiguration, capacity scale or network or component fault recovery. The monitoring information include power, loss, bit-error-rate (BER), optical signal-to-noise-ratio (OSNR), electrical signal-to-noise ratio (ESNR), etc. In practice any parameter measured in the network can be indeed used for the purpose of OPM.

Power measurement is traditionally done by OPM cards where a tunable filter sweeps the optical channel spectrum. Conventional OPM cards are large in size, consume considerable power, and are expensive modules. As a result, they are typically only deployed at limited points in the network.

Several methods of optical performance are known in the art utilizing a combination of active and passive optical components and circuits. These methods suffer from a number of drawbacks. In some cases, complex, cascading architectures are required that limit the scalability and flexibility of monitoring systems. In other cases, multiple components must be precisely tuned in order to obtain adequate results over a wide range of applications.

Accordingly, there may be a need for a system and method for the monitoring of the performance of an optical signal that is not subject to one or more limitations of the prior art.

This background information is intended to provide information that may be of possible relevance to the present invention. No admission is necessarily intended, nor should be construed, that any of the preceding information constitutes prior art against the present invention.

SUMMARY

The present disclosure relates to optical performance monitors and methods of monitoring the performance of an optical signal. It potentially addresses a number of disadvantages of the prior art, including reducing the number of required components. Use of an arrayed waveguide grating (AWG) and a Mach-Zehnder interferometer for demultiplexing signals may also contribute to the elimination of multiple other components. This in turn may allow for greater scalability and flexibility of monitoring systems, thereby resulting in a greater spectrum of applications. With fewer components to manage, the methods and apparatus disclosed herein may be used in novel circumstances that were previously inaccessible due to limitations of other architectures.

Another potential advantage of some optical performance monitors described herein is that the need for multiple components which must be precisely tuned in order to obtain acceptable results may be reduced or eliminated. This is particularly important as it also allows the present invention to be used in a wide range of applications. By having only a first stage of an optical performance monitor requiring tuning, the tuning may be performed both more easily and more accurately than over several tunable components. The first stage of the optical performance monitor may include a tunable micro ring resonator in order to facilitate the tuning.

It is an object of the present invention to obviate or mitigate at least one disadvantage of the prior art.

An aspect of the disclosure is an optical performance monitor. The monitor includes first, second and third stages coupled together in series. The first stage, which may be a tunable micro ring resonator (MRR) is configured to receive a multiplexed optical signal and to perform tunable frequency-periodic filtering on the multiplexed optical signal. Such filtering produces what is referred to as a fine filtered optical signal, which may include multiple evenly-spaced narrowband components of the input signal. The second stage is configured to receive the fine filtered optical signal and produce a pair of optical signals based on the fine filtered optical signal. The second stage may include one or more Mach-Zehnder delay interferometers (MZDIs). The third stage, which may be an (e.g. multi-input, multi-output) array waveguide grating (AWG) or similar structure, is configured to demultiplex the pair of optical signals to produce a plurality of demultiplexed optical signals. As used herein, a pair of optical signals may refer to a phase-delayed optical signal pair. The signals may be phase-delayed in the sense that the MZDI may introduce a phase delay as part of its operation. The pair of optical signals may additionally or alternatively refer to an interfered optical signal pair, reflecting that the MZDI generates a pair of optical signals, at least one of which is subsequently subjected to phase delay, and the pair of optical signals are then interfered with each other via a coupler.

In various embodiments, the second stage has a second-stage transfer function, the third stage has a third-stage transfer function, and wherein, over a predetermined operating frequency range, a combination of the second-stage transfer function and the third-stage transfer function varies less than the third-stage transfer function. In some embodiments, the second stage includes a switch configured to selectably direct the fine filtered optical signal to either one of the two outputs. Each output is coupled to a different MZDI, and the MZDI outputs are coupled to different input pairs of the third stage. The switch directs the fine filtered optical signal to different outputs depending on which portion of the frequency spectrum is currently being monitored. In some embodiments, a polarization beam splitter is provided and configured to separate the multiplexed optical signal into multiple polarized components to be monitored separately. Output of the polarization beam splitter may be provided to the input at the first stage.

An aspect of the disclosure is a system comprising plural instances of the above-described optical performance monitor, and a polarization beam splitter configured to: split an input optical signal into a plural portions based at least in part on polarization; and provide different portions to different instances of the optical performance monitor.

An aspect of the disclosure is a method of monitoring performance of an optical signal. The method includes receiving, by a tunable first stage such as an MRR, a multiplexed optical signal. The method further includes performing frequency-periodic filtering of the multiplexed optical signal by tuning the first stage, to produce a fine filtered optical signal. The method further includes receiving, by a second stage, the fine filtered optical signal. The method further includes producing, by the second stage, a pair of optical signals based on the fine filtered optical signal. The method further includes receiving, by a third stage, the pair of optical signals. The method further includes demultiplexing, by the third stage, the pair of optical signals to produce a plurality of demultiplexed optical signals.

An aspect of the disclosure is a controller, or a system including the controller and one or more optical performance monitors. The controller is configured to receive an indication of a portion of a specified optical signal to monitor. The controller is further configured to cause the above-described optical performance monitor to operate on the specified optical signal as the received multiplexed signal. The controller is further configured, based on output of the optical performance monitor operating on the specified optical signal, to provide one or more measurements of the optical signal. The controller may further be configured to receive an indication of a specified frequency resolution at which to measure the specified optical signal; and cause the optical performance monitor to perform frequency-based measurements of the specified optical signal at the specified frequency resolution.

Embodiments have been described above in conjunctions with aspects of the present invention upon which they can be implemented. Those skilled in the art will appreciate that embodiments may be implemented in conjunction with the aspect with which they are described but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

Some aspects and embodiments of the present invention may be suitable to be implemented as optical components both small in size and suitable for low cost manufacturing processes. Embodiments are also controllable using a small number of inputs to allow for high speed measurements and simplified control circuitry.

BRIEF DESCRIPTION OF THE FIGURES

Further features and advantages of the present invention will become apparent from the following detailed description, taken in combination with the appended drawings, in which.

DETAILED DESCRIPTION

Figure 1:
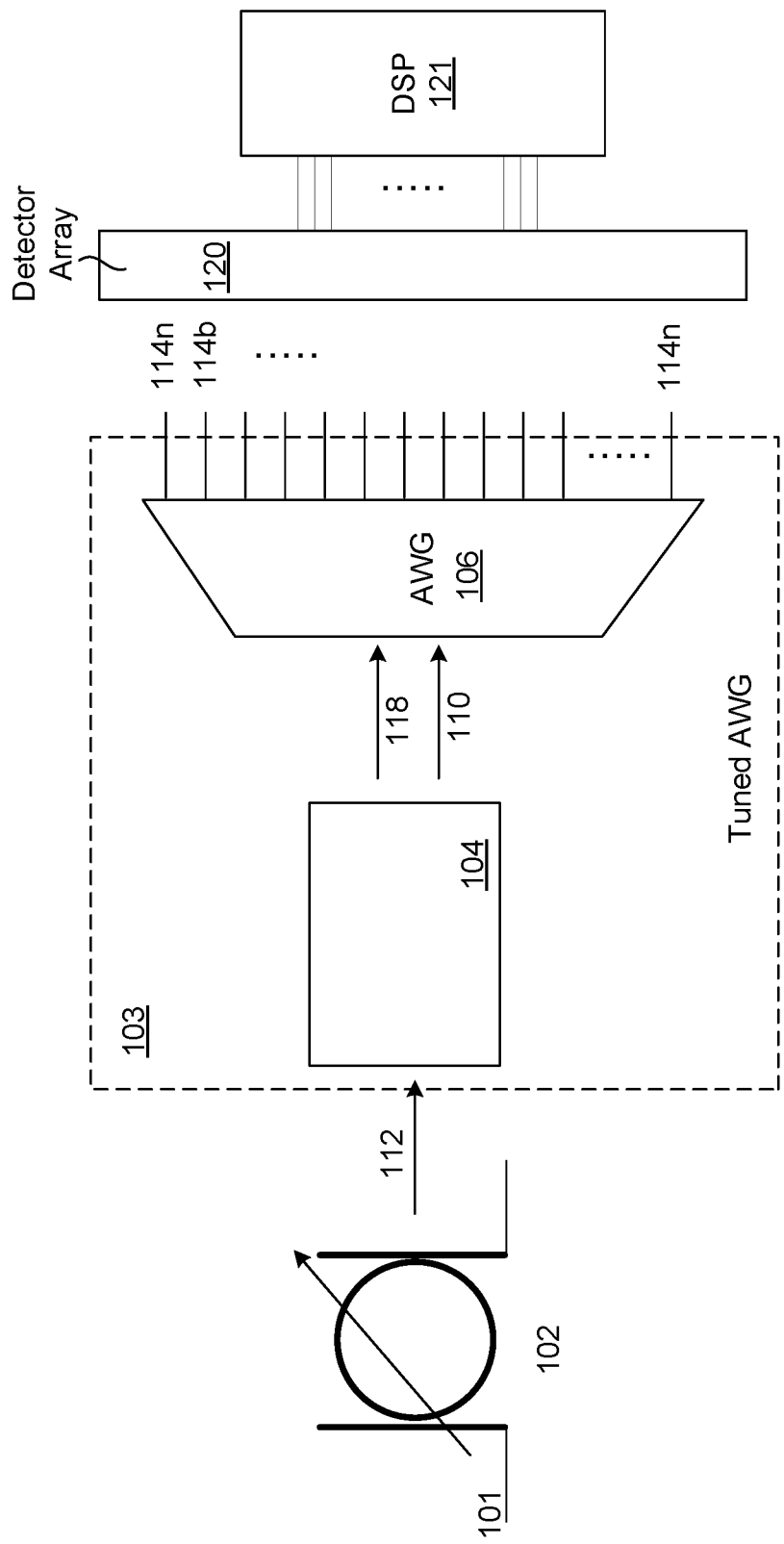
FIG. 1 illustrates a system utilizing an embodiment of the invention to perform performance monitoring of an optical signal.

Embodiments of the invention provide a system and methods for monitoring the performance of an optical signal. Embodiments may provide monitoring for industrial standard optical transmission systems based on ITU standards such as the C-band from 1530 nm to 1565 nm as well as other standard and non-standard bands. Embodiments may be used for various optical performance monitoring (OPM) applications including both flex-grid and fixed grid applications. Flex-grid is when the optical WDM signal can be anywhere in the optical spectrum with any desired bandwidth. Flex-grid has a flexible channel size including start frequency and end frequency for WDM signals. Fixed grid is limited to fixed frequencies and wavelengths having known center frequencies, (for example, the ITU 50 GHz/ 100 GHz WDM standards). Embodiments comprise a scalable architecture to operate over a variety of optical bands and wavelengths. Embodiments are suitable to be implemented as optical components both small in size and suitable for low cost manufacturing processes. Embodiments are also controllable using a small number of inputs to allow for high speed measurements and simplified control circuitry.

According to embodiments of the invention, a periodic filter, an MZDI stage and an AWG stage are coupled in series to provide for an optical spectrometer or performance monitor device. The MZDI stage plus the AWG stage can be referred to as a compensated AWG stage. The periodic filter, or its functional equivalent, is also referred to herein as a first stage of the optical performance monitor. The periodic filter may be characterized as a periodic notch filter, comprising a plurality of narrowband notches. The periodic filter may be a micro ring resonator (MRR). The periodic filter may comprise a plurality of MRRs in parallel, cascade, or both. The periodic filter has a frequency response (transfer function) which only passes portions of the input signal occurring within a plurality of narrow frequency bands. The plurality of narrow frequency bands may be evenly spaced, such that each adjacent pair of frequency bands is separated by an amount which is defined as the free spectral range (FSR) of the periodic filter. The periodic filter may be tunable over the entire FSR. That is, the periodic filter may be tunable such that at least one of the narrow frequency bands can be set to substantially coincide with any arbitrary frequency within a given operating range. For clarity, to emphasize that the filtering is periodic in the frequency domain, the periodic filter may also be referred to as a frequency-periodic filter, or a stage which performs frequency-periodic filtering. Output of the frequency-periodic filtering may be referred to as a fine filtered optical signal. The term "fine filtering" generally denotes that the filter is relatively precise in which frequencies are passed by the filter. In other words, the passbands of the filter are narrowband. Fine filtering may facilitate high resolution (or high granularity) measurements by the optical performance monitor, because it allows narrow frequency bands to be passed for measurement, meaning that specific frequencies can be measured with high precision.

For simplicity, it is assumed herein that the first stage is relatively ideal in the sense that frequency tuning of the first stage simply shifts the first stage's (narrow) passbands without substantially affecting other aspects such as gain. Alternatively, it may assumed that the gain of the first stage is a function of frequency, according to a known characteristic. In some embodiments, the compensated AWG stage is further configured to compensate for frequency-dependence of gain (or phase shift) in the first stage. That is, the second and third stages may be designed taking into consideration the non-flatness of frequency response in the the first stage.

The compensated arrayed waveguide grating (AWG) stage comprises a multi-input, multi-output conventional AWG having at least two of its inputs coupled to a particular Mach-Zehnder delay interferometer (MZDI), also referred to as a Mach-Zehnder structure. In some embodiments, a first pair of inputs of the AWG can be coupled to a first MZDI. The input of the MZDI is coupled to the output of the periodic filter. The MZDI, or its functional equivalent, may form part or all of a second stage of the optical performance monitor. The conventional AWG, or its functional equivalent, is also referred to herein as a third stage of the optical performance monitor. In some embodiments, the third stage consists essentially of a single AWG. In some embodiments, the third stage comprises two or more multi-input, multi-output AWGs, for example operating in parallel and accepting inputs of different parallel MZDIs.

In some embodiments, one or more input ports, output ports, or both, of the AWG can be used for calibration purposes, for example by coupling these ports to other calibration components, such as optical or electronic components.

In some embodiments, a second pair of inputs of the AWG can additionally be coupled to a second MZDI, which may form another part of the second stage. In some embodiments, additional pairs of inputs of the AWG can additionally be coupled to additional MZDIs (e.g. of the second stage). The inputs of the plural MZDIs are coupled to the output of the periodic filter. When two, three or more MZDIs are present and connected to different pairs of inputs of the AWG, the inputs of the MZDIs can be switchably coupled to the output of the periodic filter. For a plurality of N MZDIs, a controllable 1×N optical switch, for example based on another Mach-Zehnder architecture, can be used for this purpose. The controllable optical switch may also form part of the second stage. It is contemplated that the second stage, or the second stage coupled with the third stage, may be adapted for operation in other embodiments, even without necessarily requiring the first stage (periodic filter).

Each MZDI comprises a 2×2 input optical coupler, a pair of arms, and a 2×2 output optical coupler. One (or both) of the arms may comprise a phase shifter. Such a structure is commonly used in optical switches, for example to route an optical signal present at an input to a selected one of the two outputs by setting the phase shift. Generally speaking, the input optical coupler separates a signal present at one of the inputs into two parts, which are directed into the upper and lower arms of the structure. The arms, by virtue of differing lengths thereof, phase shifters incorporated therein, or a combination thereof, induce a corresponding relative phase shift between the two parts of the signal. As such, when the two parts of the signal are re-combined in the output optical coupler, constructive and/or destructive interference occur. The result is a particular interference pattern at the outputs, which for example can be set so that controllable portions of the signal can be routed to the two outputs of the structure. Such operation is well understood in the art. The portions can be such that 100% of the input signal is routed to the upper output, 100% of the input signal is routed to the lower output, or x % of the signal is routed to the upper output and (100-x) % of the signal is routed to the lower output, where $0<x<100$. The resolution of x depends on the resolution of the phase shifter and other physical parameters and manufacturing tolerances.

Each MZDI, in operation, is accordingly configured to produce a (e.g. phase-delayed) interfered optical signal pair, also referred to as a pair of optical signals, phase-delayed optical signals, or interfered optical signals. The optical signal pair consists of a pair of signals produced at the two MZDI outputs, where the signals are both generated based on the same input signal and are substantially phase-delayed and interfered copies of the input signal.

By suitably setting the relative phase shift in the interferometer arms, the compensated AWG stage (that is, the AWG coupled with the MZDI) can be configured so that it has a flatter frequency response (over a range of interest) than the AWG would alone. The MZDI stage thus compensates for non-uniformity in the AWG spectral response. It is the combination of the configured MZDI and the AWG that produces this flat frequency response over a certain range. To create the desired combination, both outputs of the MZDI are coupled to different inputs of the AWG. The MZDI is tuned (by setting of the relative lengths of its two arms and/or setting of its phase shifter or phase shifters) to generate an output that causes the compensated AWG stage (i.e. the AWG in combination with the tuned MZDI), to exhibit the desired flat frequency response. According to such tuning, the MZDI may concurrently provide signals at both its output ports. The tuning is an important step in achieving the desired frequency response, and can be done by experiment, or by following predetermined guidelines, or a combination thereof. It has been determined through simulation that a desirably flat frequency response can be achieved in this manner, and examples are presented elsewhere herein.

According to various embodiments, different AWG outputs can be monitored when it is required to measure signal components in different frequency ranges. The different AWG outputs can be monitored sequentially or concurrently. Each AWG output can be configured, by suitable tuning of the MZDI portion of the compensated AWG, to exhibit a flat frequency response (relative to the frequency response of the AWG alone) for a different frequency range. As such, when it is desired to obtain a measurement within a particular frequency range, the corresponding output of the AWG can be monitored.

In practice, although the frequency response of the compensated AWG can be made flatter than the frequency response of the AWG alone, it is more difficult to make the frequency response flat over a frequency range that approaches or is equal to the channel spacing. The channel spacing can be configured to be equal to the spacing between frequency bands of the periodic filter, i.e. the FSR. FSR may be defined as the frequency-domain periodicity of the first stage filter, measured for example in wavelengths or units of length (e.g. nanometers). In this case, there may be some frequency ranges for which the MZDI plus the AWG significantly attenuates signals, rather than having a flat frequency response.

To address this, some embodiments of the present invention provide for multiple MZDIs provided in parallel and coupled to different pairs of inputs of the compensated AWG. Each MZDI is configured, in cooperation with the AWG, to produce a set of frequency responses which are flat over different frequency ranges. An optical switch is configured to route the signal from the periodic filter to a selected one of the MZDIs. Thus, when it is desired to monitor a certain optical frequency, the switch can be operated to route the signal through an appropriate MZDI, and an appropriate output or appropriate outputs of the AWG can be monitored. The appropriate MZDI and AWG outputs are selected as those which exhibit a relatively flat frequency response at and around the optical frequency (or frequencies) currently being monitored. In this manner, each frequency over a substantially contiguous range can correspond to a flat frequency response for a particular one of the MZDIs and AWG channels.

Figure 3A:
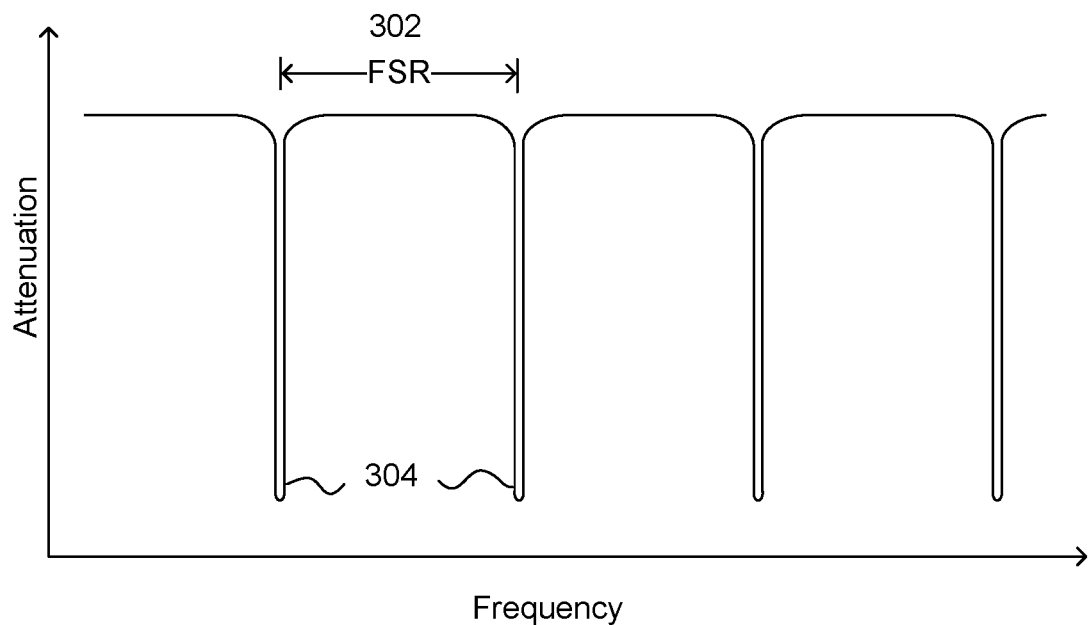
FIG. 3A illustrates the attenuation frequency response of a micro ring resonator as utilized by embodiments.
Figure 3B:
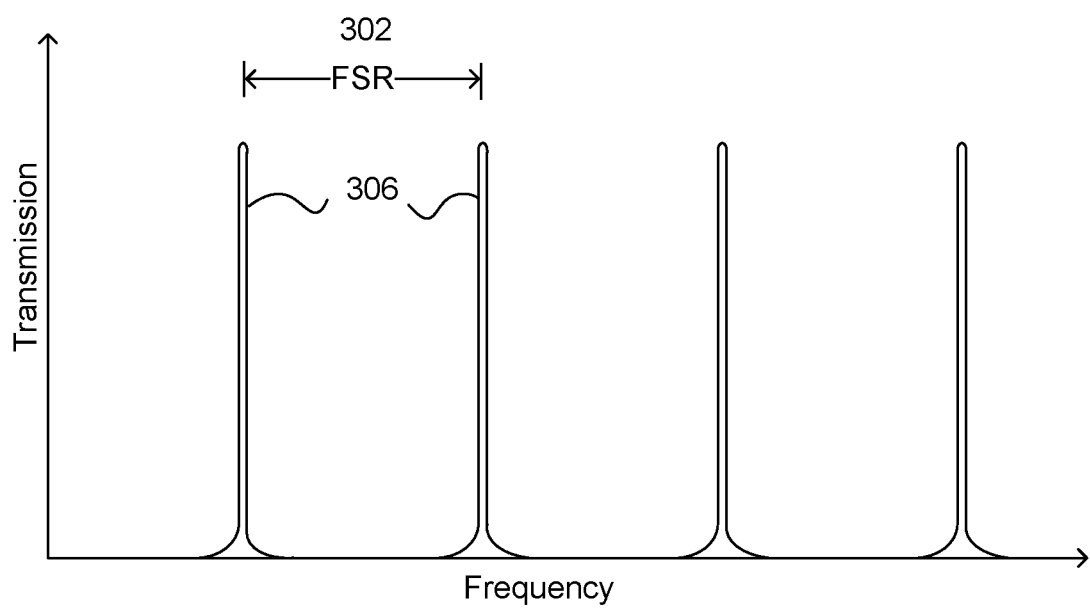
FIG. 3B illustrates the transmission frequency response of a micro ring resonator as utilized by embodiments.

The frequency responses provided by different MZDIs can be substantially frequency-shifted copies of one another. For example, consider the case in which the periodic filter passes portions of the signal within a plurality of narrow bands, with adjacent narrow bands being separated by frequency difference $\Delta f$. That is, for some tunable frequency $f_t$, the narrow bands are centered at frequencies $f_t$, $f_t+\Delta f$, $f_t+2\Delta f$, $f_t+3\Delta f$, etc. The value of $\Delta f$ may match the FSR of the periodic filter. FIGS. 3A and 3B illustrate narrow bands at MRR resonances 304, 306, the first of which corresponds (for illustrative purposes) to $f_t$.

The AWG, together with a first MZDI (e.g. 204A in FIG. 2 or FIG. 8) can be tuned to have a transfer function which has the following properties. For some frequency $f_1$, the transfer function is relatively flat between $f_1-\Delta f/N$ and $f_1+\Delta f/N$ (and thus has width $2\Delta f/N$). For purposes of the present example, N is taken as a whole number greater than or equal to 2, however this is for simplicity only, and N can alternatively take an arbitrary value. Outside of this flat region, the transfer function falls off, for example gradually or precipitiously, to rise again to the next flat peak. See e.g. transfer function 404 in FIG. 4 or transfer function 804 in FIG. 9. The transfer function of the AWG plus MZDI is also periodic with periodicity $\Delta f$. In particular, just as with the periodic filter, the transfer function of the AWG plus MZDI has flat portions centered at $f_1$, $f_1+\Delta f$, $f_1+2\Delta f$, $f_1+3\Delta f$, etc. Therefore, for each flat portion centered at $f_1+k\Delta f$ (for some whole number k≥0), the transfer function is relatively flat between $(f_1+k\Delta f)-\Delta f/N$ and $(f_1+k\Delta f)+\Delta f/N$.

For N equal to two, it follows that the flat regions of the transfer function are (in theory) substantially contiguous with one another, and only one MZDI is necessary. However, for N equal (without loss of generality) to four, the transfer function's "flat" bandwidth narrows and gaps appear between adjacent flat regions of the transfer function. To address these gaps, a second MZDI is added (see e.g. 204B in FIG. 2 or FIG. 8). The second MZDI plus AWG has a transfer function similar to the first MZDI plus AWG, but with its flat portions centered at $f_2$, $f_2+\Delta f$, $f_2+2\Delta f$, $f_2+3\Delta f$, etc. The flat portions are still of width $2\Delta f/N$. When $f_2$ is set midway between $f_1$ and $f_1+\Delta f$, the transfer function for the first MZDI plus AWG is perfectly interleaved with the transfer function for the second MZDI plus AWG. See e.g. transfer function 402 in FIG. 4 or transfer function 802 in FIG. 9. That is, in regions where the transfer function for the first MZDI plus AWG falls of between flat peaks, transfer function for the second MZDI plus AWG exhibits a flat peak and vice-versa. As such, for a given frequency of interest, there always exists a MZDI which is flat around the frequency of interest. For larger values of N, additional MZDIs can be added with similar effect.

For clarity, the term "transfer function" refers to the relationship between input signals and output signals, which can be viewed as a function of frequency. Although transfer functions can refer to phase relationships, for ease of exposition transfer functions will be discussed herein primarily in terms of gain (amplitude) relationships. A "flat" region of a transfer function is an operating frequency range such that the variation in gain as a function of frequency is below a predetermined threshold value. According to various embodiments, the operating frequency range is approximately equal to a frequency-domain period of the periodic filter, or a portion thereof. When a first transfer function is said to be flatter than a second transfer function over a given frequency range, it means that there exists a threshold value such that the variation in gain as a function of frequency is below the threshold value for the first transfer function, while the variation in gain as a function of frequency is above the threshold value for the second transfer function. A potential benefit of a "flat" transfer function is that the sensitivity to frequency variation is reduced, which is advantageous for monitoring optical signals for example by sweeping over a range of frequencies.

More generally, the AWG, together with each of M MZDIs (including the first MZDI above) can be similarly configured, but offset in frequency. M is an increasing function of N, for example M can be approximately equal to N/2. This can easily be verified for N equal to a power of two. Each of the MZDIs has a periodic transfer function with plural flat regions, but the flat regions are shifted in frequency so that, for each given frequency of interest, there exists a combination of a MZDI and the AWG which produces a transfer function which is generally flat at and immediately around the frequency of interest. Switching is then performed to route the output of the periodic filter through this MZDI.

Figure 2:
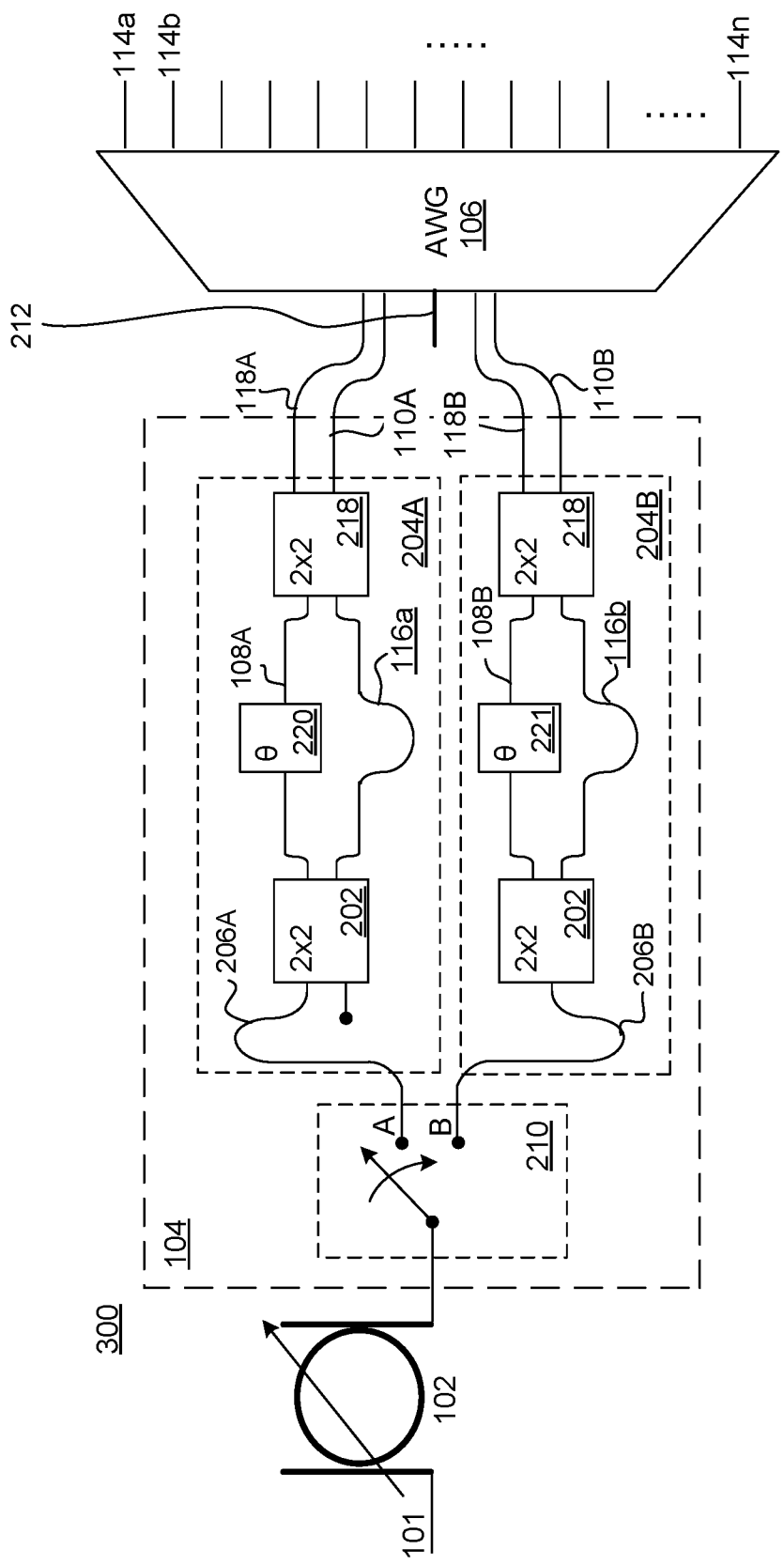
FIG. 2 illustrates an embodiment of the invention comprising two Mach-Zehnder delay interferometers.

For example, consider the case where the periodic filter has a certain period (in the frequency domain) and there are two parallel MZDIs in the optical performance monitor (e.g. as in FIG. 2). For purposes of the present discussion, the period has a width, in the frequency domain, of one FSR (e.g. as in FIG. 3A or 3B). However, rather than the period defined so that it begins at one peak and ends at the next, the period is defined as in FIG. 4, so that it begins at one quarter of the FSR before a peak (i.e. an MRR resonance 306) and ends at one quarter of the FSR before the next peak. The first half of the period is then defined as the frequency range from $f_r-\Delta f/2$ and $f_r+\Delta f/2$, for some frequency $f_r$ which is a frequency of the MRR resonance 306. The second half of the period is then defined as the frequency range from $f_r+\Delta f/2$ and $f_r+3\Delta f/2$. Now, the first MZDI is tuned to provide a generally flat transfer function (of the MZDI plus AWG) over the first half of the period, while the second MZDIs is tuned to provide a generally flat transfer function (of the MZDI plus AWG) over the second half of the period. An optical switch is then operated so that the output of the periodic filter (also referred to as a fine filtered optical signal) is provided to the first MZDI when it is desired to monitor a frequency in the first half of the period, and the output of the periodic filter is provided to the second MZDI when it is desired to monitor a frequency in the second half of the period.

For further definiteness, the term "transfer function" should be understood in context of the stages to which it applies. For example, when referring to a single MZDI plus AWG, the transfer function should be understood to correspond to the input-output characteristic of that MZDI plus AWG connected in series. When referring to a second stage (e.g. 104 in FIG. 2) which includes a switch and multiple MZDIs coupled to a third stage AWG (e.g. 106 in FIG. 2), the transfer function refers to an overall transfer function of the second and third stage, where a switch selectably engages one of the multiple MZDIs as described herein.

As set forth in the example above, the periodic filter and the compensated AWG are matched such that the spacing between frequency bands of the periodic filter is substantially the same as the channel spacing (spacing between centers of flat parts of the transfer function) of the AWG. One advantage of this is that the compensated AWG can be used to simultaneously read out portions of the signal at multiple frequencies of interest, the frequencies being separated for example by Δf or multiples thereof.

FIG. 1 illustrates a system comprising an embodiment of the invention to perform performance monitoring of an optical signal. An optical input of a signal 101 to be monitored is input to a tunable micro ring resonator (MRR) 102. The output 112 of the MRR 102 is coupled to a tuned arrayed waveguide grating (AWG) 103. One, several, or all of the AWG outputs 114a-114n are in turn coupled to optical detectors 120 that convert the optical signal 101 into an electrical representation that may then be analyzed and measured by digital circuitry such as a digital signal processor (DSP) 121 or other suitable electronic systems such as CPUs, FGPAs, as are known in the art.

The MRR 102 may comprise an optical waveguide arranged in a loop fashion. The ring is in resonance when the wavelength of the light fits an integer number of times in the optical length of the ring. The MRR 102 performs fine optical filtering with a narrow passband at its resonance frequency and multiples of that frequency. The spacing between resonance frequencies is referred to as the free spectral range (FSR) of the MRR 102 and the MRR must have resonance frequencies over the optical channel comprising the range of output channels supported by the AWG used. The wavelength and FSR of the MRR 102 may be tuned, for example, by controlling the temperature of the MRR 102. Tuning of the MRR 102 may be done by varying its phase over the range from 0° to 360°, thereby covering the entire FSR. The filtering effect experienced by an optical signal should remain uniform when the MRR is tuned so that the optical signal experiences the same transmission loss when the center wavelengths of MRR output shifts. The design parameters of an FSR include the bandwidth (measured at −3 dB points) of the ring, wavelength of operation and the FSR. These parameters may be controlled based on the architecture of the MRR. Once designed the FSR is typically fixed. However, it can be dynamically controlled by proper design of the ring.

The tuned AWG 103 comprises a conventional AWG 106 as known in the art. AWGs are optical components that may demultiplex a large number of wavelengths. An AWG 106 may have one or several inputs and a larger number of outputs. AWG 106 devices operate on the principle of optics that light waves of different wavelengths interfere linearly with each other. An AWG 106 is designed with output channels tuned to specific wavelengths with each output transmitting light at that wavelength while attenuating light at other wavelengths. The bandpass of each output channel is less sharp than the MRR 102 and provides a relatively coarse filtering of the output channel. AWGs may be designed specifically to pass channels of industry standard bands such as the C-band, E-band, or L-band. AWG 106 devices also have an FSR which is typically equal to the frequency spacing between AWG output channels 114a-114n.

Once an AWG 106 is selected and the FSR of the AWG 106 known or characterized, an MRR 102 may be chosen with the same FSR over the range of wavelengths of the AWG 106 outputs. In this way, the center frequencies of the MRR 102 may correspond to the passband of the AWG 106 outputs of interest.

FIG. 1 further illustrates how embodiments may comprise a central stage 104 between the MRR 102 and AWG 106. The central stage 104 is matched to the AWG to obtain a uniform spectrum response or flat top transfer characteristic for the tuned AWG 103 over the optical band that includes the AWG outputs 114a-114n. The central stage 104 is characterized by a second-stage transfer function, which, when combined with a third-stage transfer function of the AWG results in a combined transfer function having this transfer characteristic. In more detail, the central stage 104 outputs signals 110 and 118 which are generated based on the signal output by the MRR 102. The signal output by the MRR 102 can be divided into two parts 110 and 118, which can be regarded as interfered, phase-delayed and/or attenuated versions of the signal output by the MRR.

FIG. 2 illustrates an embodiment of the invention comprising three stages. The first stage comprises an MRR 102. The central, second stage 104 comprises a 1×2 switch 210, and two Mach-Zehnder delay interferometers (MZDI), hereafter referred to as an upper 204a and a lower MZDI 204b. The third, final, stage comprises a multi-input AWG 106. The three stages are combined to produce an optical performance monitor 300.

The switch 210 receives the output of the MRR 102 and may be externally controlled to couple the received and filtered (by the MRR) optical signal 101 to the input port 206a-206b of either of the two MZDIs. The upper MZDI 204a and the lower MZDI 204b are matched to be nominally identical within the limitations of the processing technology from which they are manufactured. The upper MZDI 204a is selected when the MRR 102 is tuned from 0° to 180°, covering half the FSR 302 (See FIGS. 3A, 3B, 4) of the MRR 102. The lower MZDI 204b is selected when the MRR 102 is tuned from 180° to 360°, covering the other half of the FSR 302 of the MRR 102. The upper MZDI 204a is designed so that the transfer characteristics of the upper MZDI 204a in series with the AWG 106 provides a flat top passband shape when the MRR 102 is tuned from 0° to 180°. The lower MZDI 204b is designed so that the transfer characteristics of the lower MZDI 204b in series with the AWG 106 provides a flat top passband shape when the MRR 102 is tuned from 180° to 360°. For the example of an FSR 302 of 50 GHz, the upper MZDI 204a would be used for a phase from 0 to −25 GHz, while the lower MZDI 204b would be used for a phase of −25 GHZ to −50 GHz. This is as described above with respect to FIG. 4. Notably, the flat top passband shapes 402 and 404 are flatter than the third-stage transfer function (i.e. the transfer function of the AWG) alone.

Each MZDI comprises an input stage 202, phase delay lines 108A, 108B, 116A, 116B, and an output stage 218. The input stage 202 splits the incoming signal into two copies, of which one is phase delayed in the input stage. The phase delay is further adjusted by the delay introduced by structure of the phase delay lines 108A, 108B, 116A, 116B and one or both of the phase delay lines 108A, 108B, 116A, 116B may also comprise phase trimmers 220 to compensate for any phase bias errors introduced due to fabrication process variations. The optical signal e.g. on phase delay line 108A (or 108B) and the phase delayed optical signal e.g. on phase delay line 116A (or 116B) are passed through the 2×2 output stage 218 to be coupled to two input ports of the AWG 106.

In an embodiment, the AWG 106 is configured with 5 input ports and 84 output ports. Referring to the input ports from top to bottom with the numbers 1 to 5, the two outputs of the upper MZDI 204a are coupled to adjacent inputs 1 and 2, the two outputs of the lower MZDI 204b are coupled to adjacent inputs 4 and 5, and the center input 3 212 is unused. The AWG 106 has the function of isolating one MRR resonance 306 in each of the AWG's output channels. Each channel has a −3 dB passband width equal to one-half the channel frequency spacing, which in turn is equal to the FSR 302 of the MRR, within limitation of the manufacturing process.

In this embodiment, the first stage MRR 102 is configured or selected to match the channel spacing of the outputs of the AWG 114a-114n. The MRR 102 provides a periodic train of resonances each with a bandwidth <1 GHz, spaced by the FSR. The bandwidth of the periodic train may be determined by various methods that include the desired spectral measurement resolution. The MRR 102 is tunable from 0° to 360° over the FSR and, when tuned over its full range, the MRR resonances span the frequencies of interest of the optical signal to be analyzed. An MRR which is tunable over less than the entire FSR is, in principle, usable, with a corresponding loss of ability to monitor certain frequency bands.

FIG. 3A illustrates the frequency response of the MRR 102 as a function of attenuation vs. frequency. With a period of the FSR 302 there are a series of resonance frequencies 304 where the input signal experiences low attenuation. Inversely, FIG. 3B illustrates the frequency response of the MRR 102 as a function of transmission vs. frequency. With a period of the FSR 302 there are a series of resonance frequencies 306 where the input signal is transmitted with little loss. The attenuation in FIG. 3A refers to an attenuation between an MRR input and a non-monitoring MRR output. The transmission in FIG. 3B refers to the transmission from the MRR input to the monitoring MRR output, where the monitoring MRR output is provided to the compensated AWG.

Figure 4:
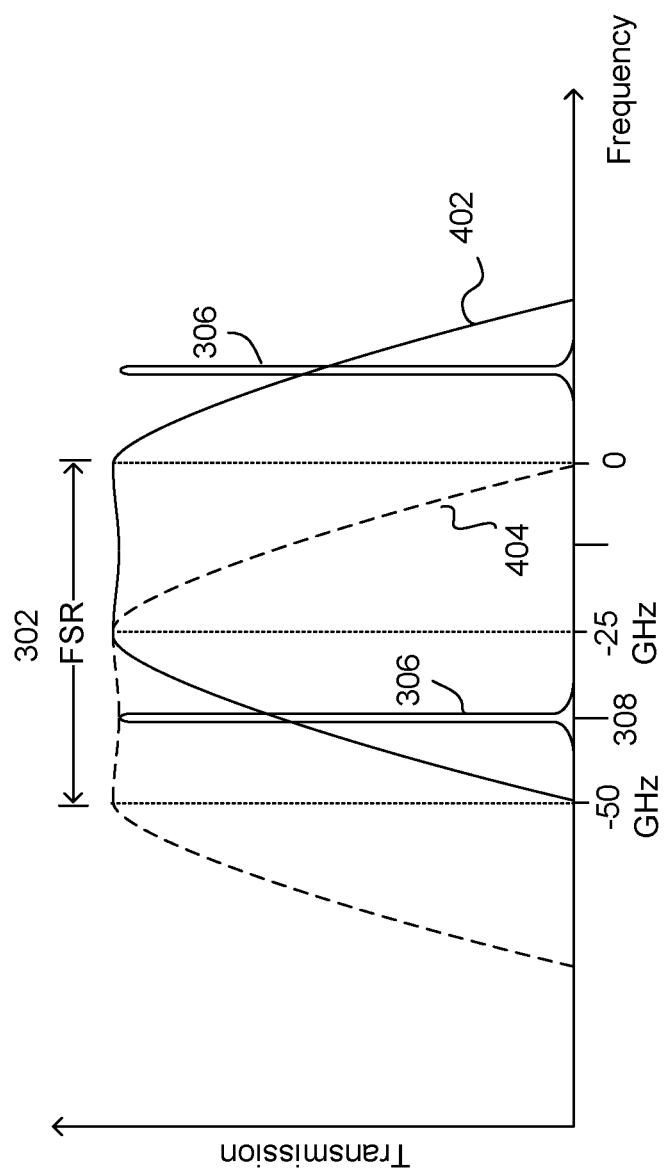
FIG. 4 illustrates how the MRR resonances correspond with the centre frequencies of the AWG output channel passbands.

With reference to FIG. 4, the second stage 104 has the function of ensuring that the centre frequency of each AWG output channel passband (402, 404) tracks the centre frequency (e.g. 308) of their associated MRR resonance 306. The second stage compensates for transfer characteristics of the AWG 106 over the optical band of interest so that the combined passband of the tuned AWG 103 (second stage 104 and AWG 106) approaches an ideal flat top passband shape. In more detail, FIG. 4 illustrates, in the frequency domain, the transfer function of a first stage, overlaid with the combination of a second-stage transfer function and a third-stage transfer function. The transfer function of the first stage is that of the MRR or other periodic filter, and is characterized by MRR resonances 306, which are narrow passbands. The second-stage transfer function is that of the second stage (i.e. the MZDI) and the third-stage transfer function is that of the third stage (i.e. the AWG). The second-stage and third-stage transfer functions are not illustrated individually, but the combination transfer function resulting from their serial combination is. This combination transfer function is characterized by curves 402 and 404. In particular, and with reference to FIG. 2, the curve 402 corresponds to the combination transfer function when the switch 210 couples the output of the MRR 102 to the upper MZDI 204a, while the curve 404 corresponds to the combination transfer function when the switch 210 couples the output of the MRR 102 to the lower MZDI 204b. By design, the flat tops of the curves 402 and 404 are contiguous, and span a bandwidth approximately equal to the FSR 302 of the MRR 102.

Figure 5:
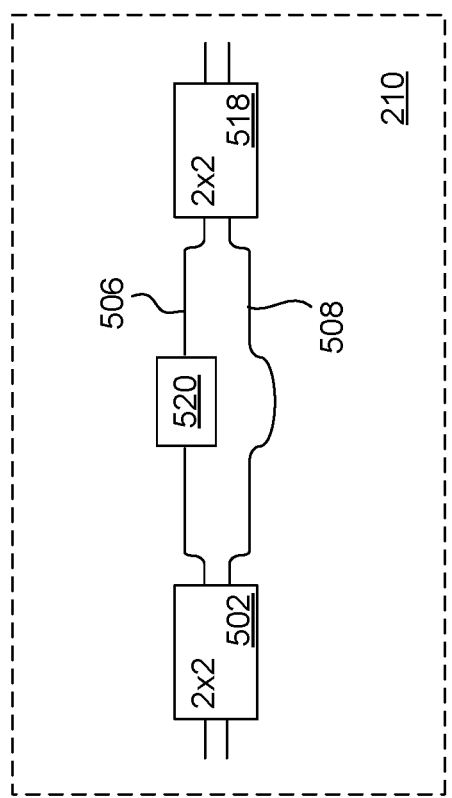
FIG. 5 illustrates an optical switch comprising a Mach-Zehnder interferometer.

In an embodiment, the switch comprises a Mach-Zehnder interferometer configured as a switch as illustrated in FIG. 5. In this figure, the switch 210 comprises an input stage 502, an output stage 518, controllable phase shifter 520, upper arm 506 and lower arm 508. The input stage 502 and output stage 518 can each be 2×2 optical couplers, such as 3 dB couplers. The upper arm 506 and the lower arm 508 may have the same optical length. The controllable phase shifter 520 can be configured to impart a phase shift causing constructive interference at a selected one of the outputs of the output stage 518 and destructed interference at the other. By adjusting the phase shift, the signal present at one of the inputs to the input stage 502 can be controllably routed (in a controllable proportion) to a selected one of the outputs, as will be readily understood by a worker skilled in the art. Rather than one phase shifter, each of the upper and lower arms can include its own phase shifter, which are cooperatively controlled, for example in a push-pull configuration.

Figure 6:
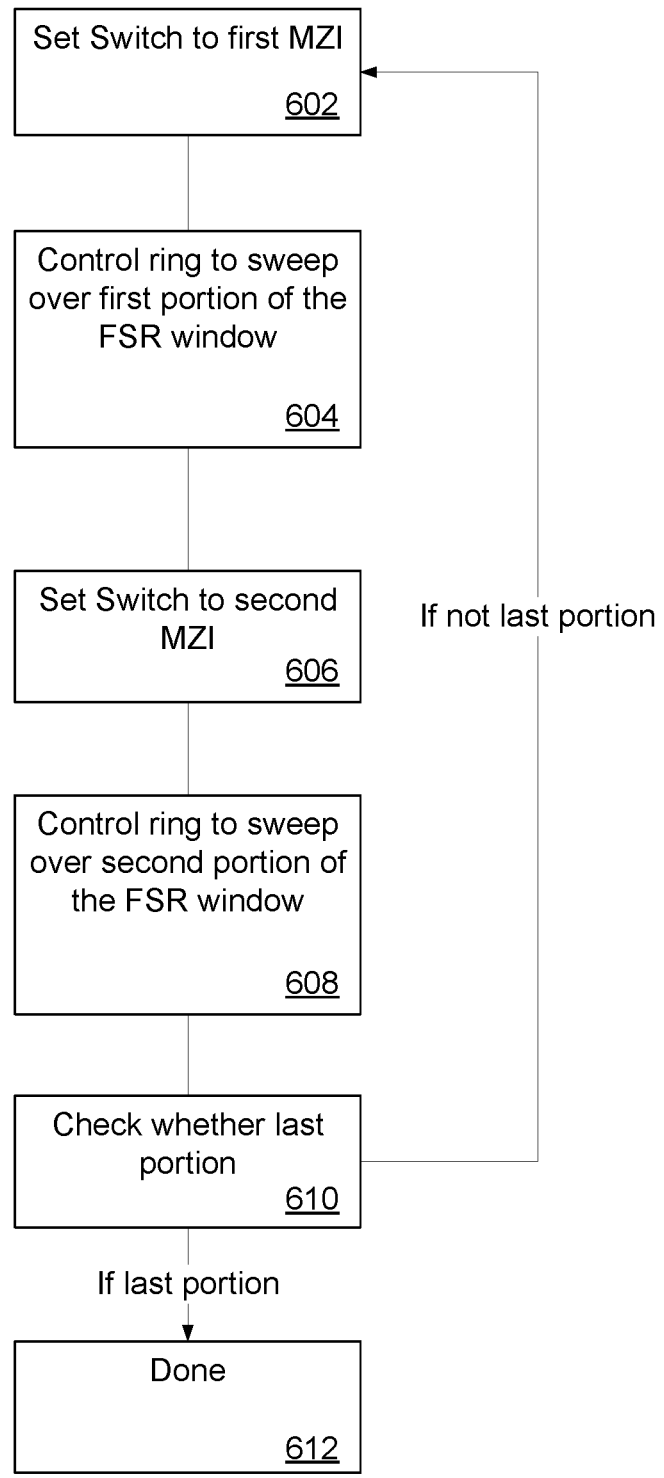
FIG. 6 illustrates a method for the use of an embodiment of the invention.

FIG. 6 illustrates the use of the above embodiment as a method. Initially, at step 602, the switch 210 is set to position A with the optical output of the MRR 102 coupled to the upper MZDI 204a. The MRR 102 is controlled to have a phase of 0°, corresponding to an upper side of the odd numbered output channels of the AWG 106. With the switch 210 in position A, The MRR 102 is then controlled to scan and tune its phase from 0° to 180° at step 604. The MRR 102 phase of 180° corresponds to the lower side of the odd numbered output channels of the AWG 106. During this time, data is collected for the odd numbered AWG 114a-114c- . . . output channels. When the MRR 102 phase reaches 180°, a handover occurs, and the switch 210 is changed to position B and the optical output of the MRR 102 is coupled to the lower MZDI 204b, at step 606. The MRR 102 is controlled to scan and tune its phase from 180° to 360°, at step 608, corresponding to the even numbered output channels of the AWG 114b-114d . . . . In this way readings are collected for odd numbered channels while the switch is in position A and for even numbered channels while the switch is in position B, thereby collecting data at intervals of the tuning resolution of the MRR 102 over the optical band encompassed by the output channels of the AWG 106. At step 610, a check is performed to determine if the last actions corresponded to scanning of a last desired portion of the spectrum. If so, the method concludes at step 612. Otherwise, the next desired portion(s) of spectrum are scanned by a repetition of steps 602, 604, 606 and 608.

It is understood by those having skill in the art that optical channels and bands may be referred to by wavelength or frequency. Similarly, the tuning of an MRR 102 may be described by a phase angle or a corresponding frequency offset determined by the FSR.

Figure 7:
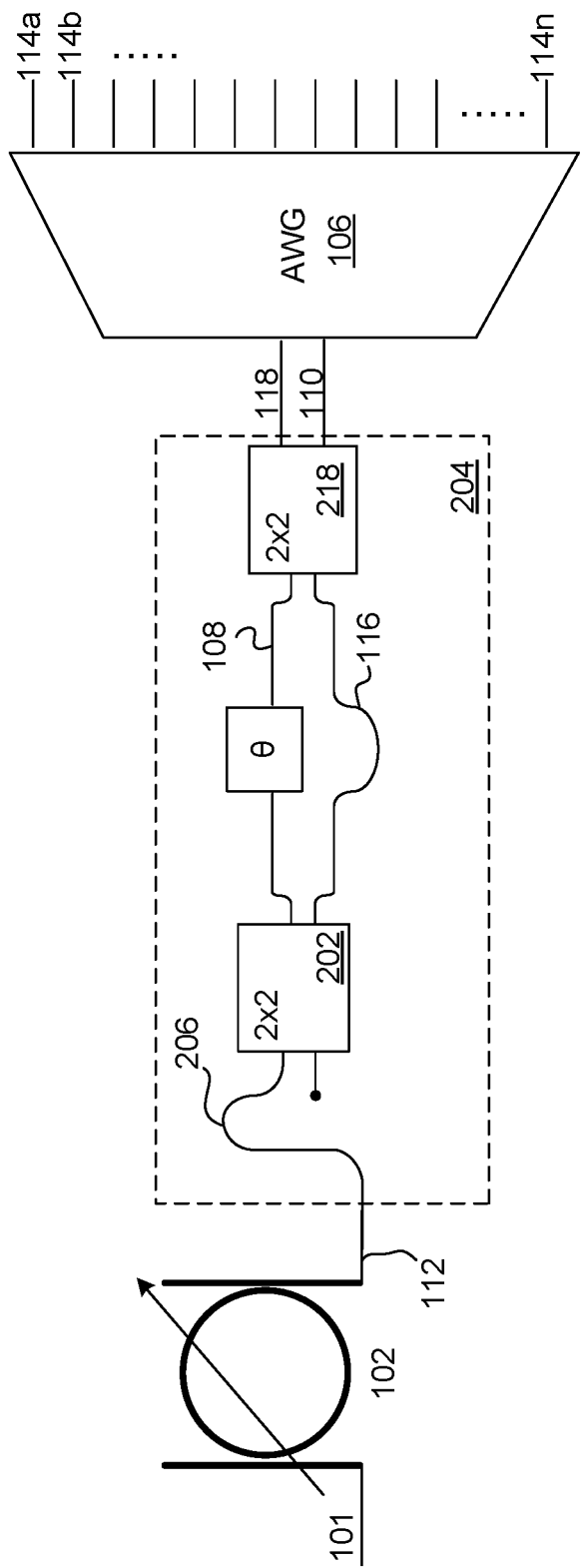
FIG. 7 illustrates an embodiment comprising a single Mach-Zehnder delay interferometer.

As illustrated in FIG. 7, in some embodiment, only one MZDI 204 may provide an adequately flat top passband shape for the transfer characteristics of the combined MZDI 204 and AWG 106. In this case, no switch is required and the MRR may be tuned from 0° to 360° in a single scan in order to read the entire optical band. For this embodiment, the AWG would require only a single input port pair.

Figure 8:
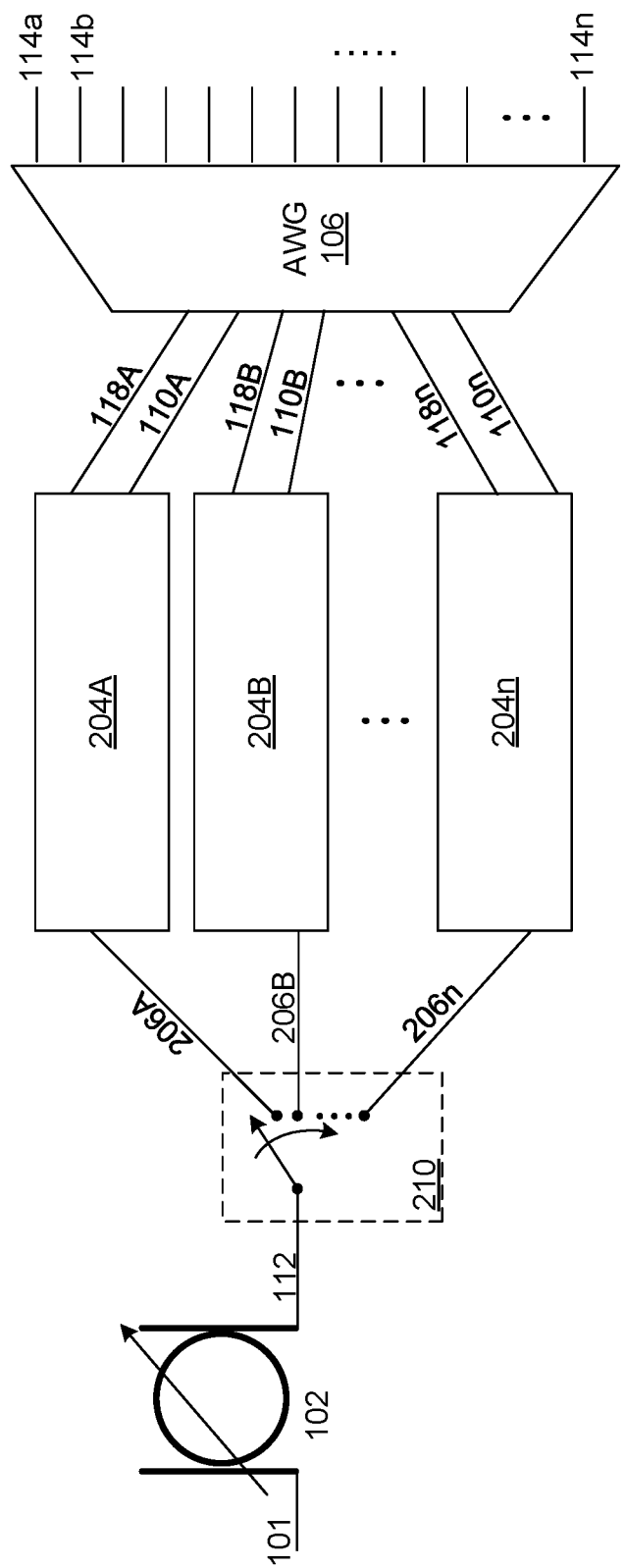
FIG. 8 illustrates another embodiment comprising multiple Mach-Zehnder delay interferometers.

As illustrated in FIG. 8, in further embodiments, it may be required to use three or more MZDIs 204a-204n in order to obtain an adequately flat top passband shape for the transfer characteristics of the combined MZDIs and AWG 106. In this case, a more complex, 1×3 switch 210 is required and the MRR 102 may be tuned from 0° to 120°, 120° to 240°, and 240° to 360° in three scans in order to read the entire optical band. The AWG 106 would also require three sets of input port pairs.

In this same way, a larger number of MZDIs and correspondingly switches and AWG input port pairs would be used.

In further embodiments, the switch may be implemented using ways other than the use of an MZI as in the embodiment.

Figure 9:
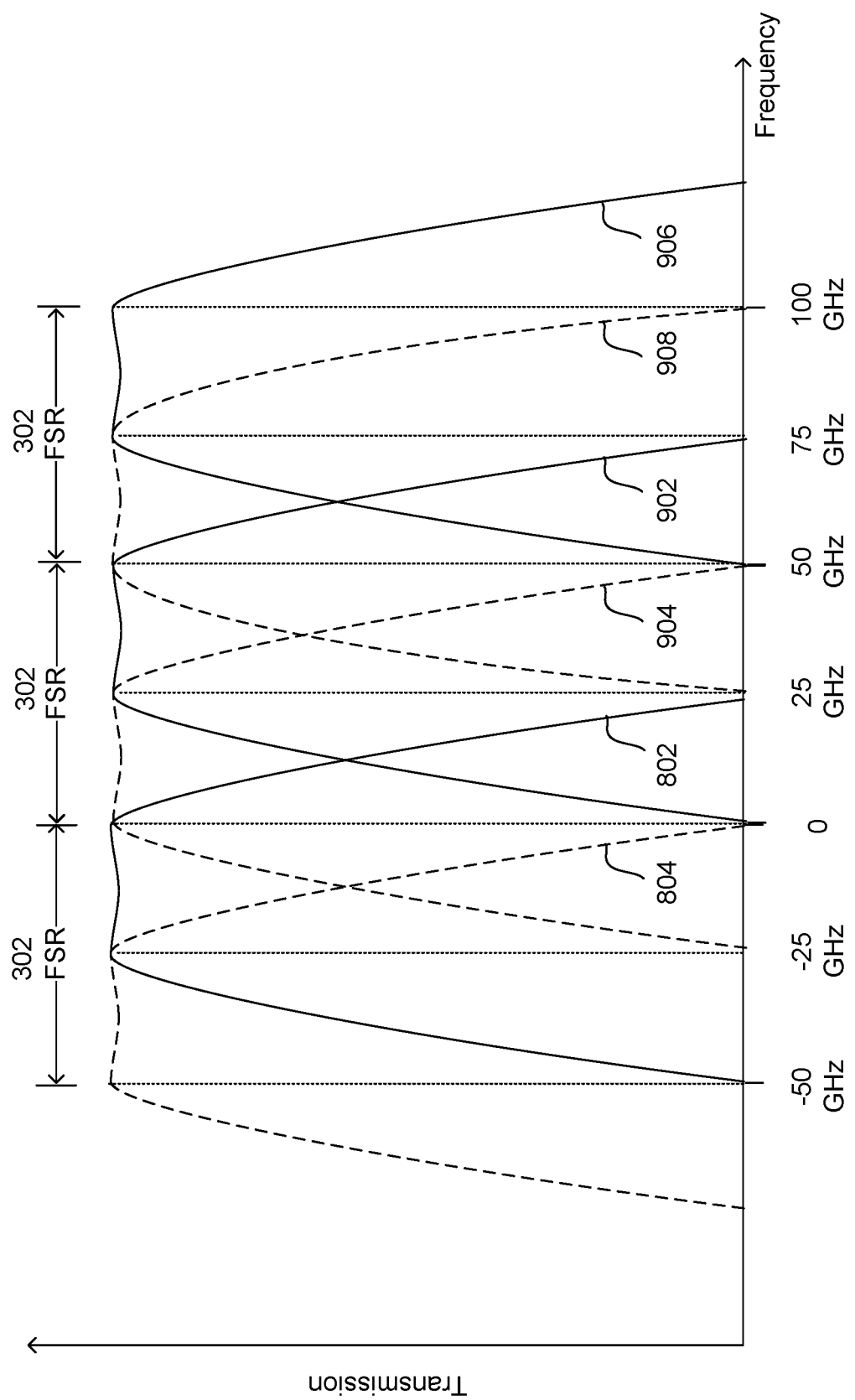
FIG. 9 illustrates another embodiment comprising transfer functions of combined Mach-Zehnder delay interferometers and arrayed waveguide gratings.

FIG. 9 illustrates transfer functions of combined MZDIs and AWGs, according to another embodiment of the present invention. FIG. 9 is similar to FIG. 4, except that additional transfer functions are shown. Transfer functions 802 and 804 in FIG. 9 are substantially the same as transfer functions 402 and 404, respectively, in FIG. 4. Transfer functions 802 and 804 correspond to the transfer functions obtained when reading the same output of the AWG. In contrast, transfer functions 802, 902 and 906 correspond to the transfer functions obtained when reading different respective outputs of the AWG, when the switch 210 couples the output of the MRR 102 to the upper MZDI 204a. Similarly, transfer functions 804, 904 and 908 correspond to the transfer functions obtained when reading different respective outputs of the AWG, when the switch 210 couples the output of the MRR 102 to the lower MZDI 204b. Notably, the flat tops of the transfer functions 804, 802, 904, 902, 908, 906 are substantially contiguous with one another and cover a frequency range from −50 GHz to 100 GHz, relative to some center frequency.

Figure 10:
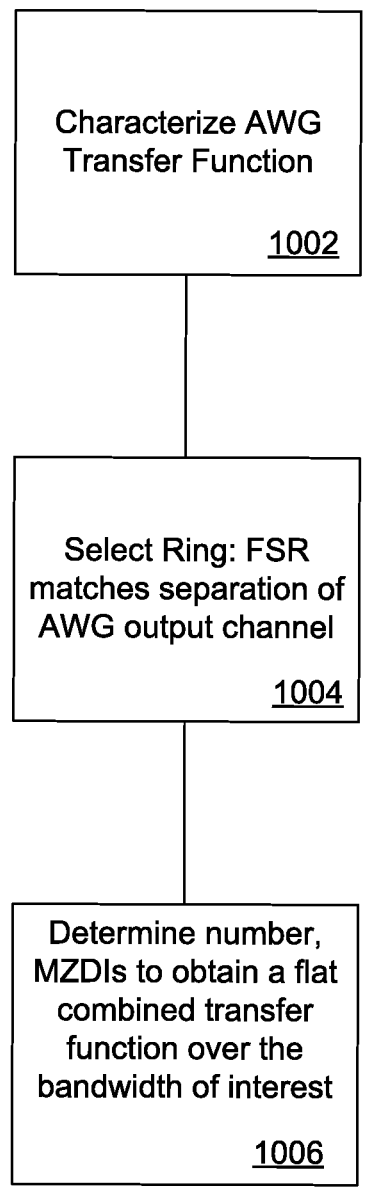
FIG. 10 illustrates a method used for designing embodiments of the present invention.

FIG. 10 illustrates a method used for designing embodiments of the present invention for use. The method includes, at a first step 1002, characterizing an AWG transfer function. The AWG transfer function can be characterized for example by determining the attenuation of the AWG over a range of frequencies. The AWG transfer function can be characterized by determining the frequency separation between different output channels of the AWG. The characterization can be performed for multiple channels of the AWG. The characterization can be performed by experiment, simulation, theoretical analysis, or by reference to specifications of a pre-designed AWG. The method includes, at a second step 1004, selecting a ring (i.e. a MRR) having a FSR which matches the separation between AWG output channels. The method includes, at a third step 1006, determining the number of MZDIs to obtain a flat combined transfer function over the bandwidth of interest. This can be done experimentally, through simulation, or theoretical analysis, or a combination thereof. Examples of apparatuses with one, two, and multiple MZDIs are illustrated herein for example with respect to FIGS. 2, 7 and 8.

Figure 11A:
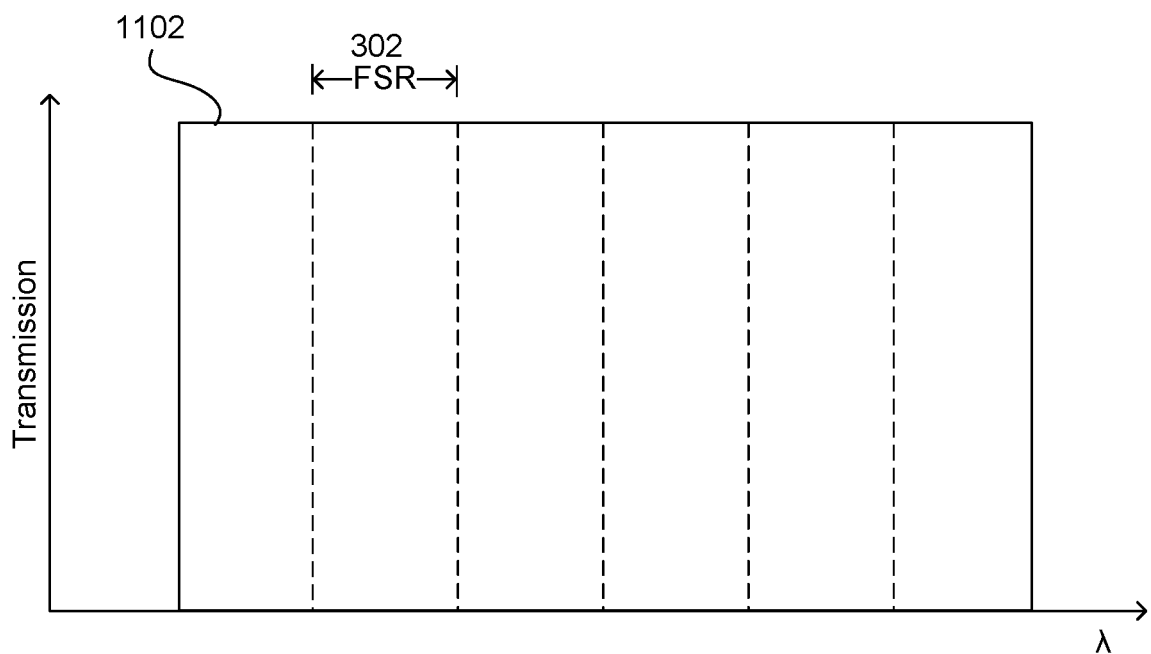
FIG. 11A illustrates an idealized combined transfer function of a combined Mach-Zehnder delay interferometer and arrayed waveguide grating.
Figure 11B:
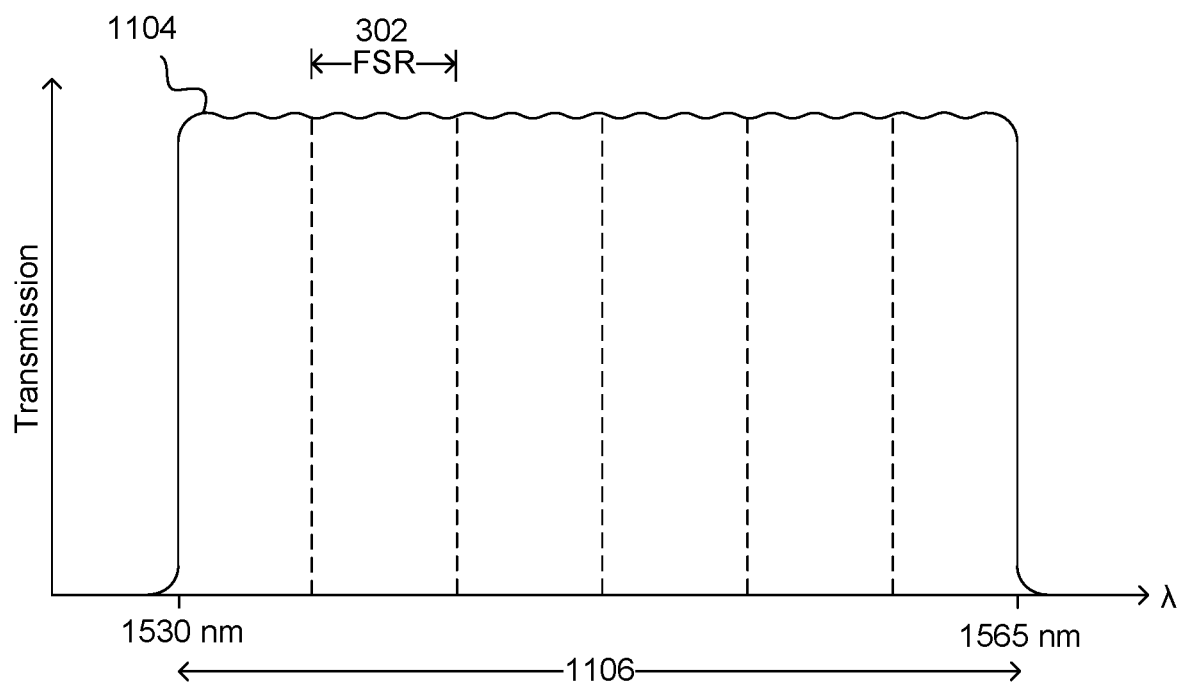
FIG. 11B illustrates a more realistic combined transfer function of a combined Mach-Zehnder delay interferometer and arrayed waveguide grating.

FIG. 11A illustrates the idealized combined transfer function 1102 of an MZDI plus AWG, according to an example embodiment of the present invention. The transfer function 1102 is illustrated as a function of wavelength, rather than frequency in this example. The transfer function has a flat top, a bandwidth of multiple FSRs, and is shaped as an idealized bandpass filter. FIG. 11B shows a somewhat more realistic version 1104 of the combined transfer function of FIG. 11A. The top of the transfer function is not perfectly flat and the frequency drop-off, while steep, does not have jump discontinuities in its slope. In the present example, the transfer function 1104 is a bandpass filter which passes wavelengths between 1530 nm and 1565 nm, thus having an overall bandwidth 1106 of 35 nm.

Figure 12:
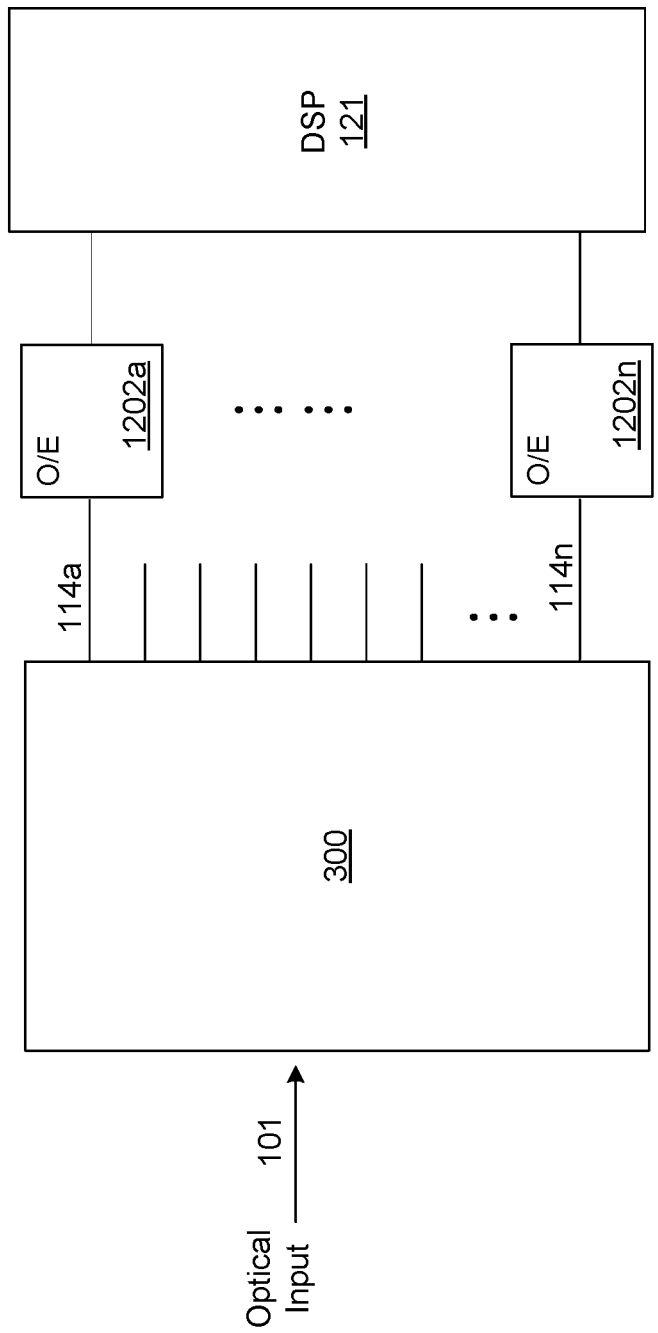
FIG. 12 illustrates an apparatus comprising the optical performance monitor of FIG. 2.

FIG. 12 illustrates an apparatus including the optical performance monitor 300 of FIG. 2, or a variant thereof. FIG. 12 can be regarded as an alternative to FIG. 1. According to FIG. 12, the AWG outputs 114a-114n are subsequently sent to dedicated optical-to-electrical (O/E) signal converters 1202a-1202n that convert the received optical signal (which is generated based on optical input signal 101) into an electrical representation. The electrical representations output by the O/E signal converters may then be analyzed and measured by digital circuitry such as a digital signal processor (DSP) 121 or other suitable electronic systems such as CPUs, FGPAs, as are known in the art. By including the O/E signal converters 1202a-1202n, the signal may potentially be processed faster by the DSP 121.

In some embodiments, the optical performance monitor can be used with or incorporate a polarization beam splitter. The polarization beam splitter can separate different optical signal components for measuring separately, by the same optical performance monitor or by different optical performance monitors operating in parallel. The polarization beam splitter may be configured to separate the multiplexed optical signal input to the optical performance monitor, or to separate an optical signal generated by the optical performance monitor based on the multiplexed optical signal. The signal can be separated into multiple, differently polarized components to be monitored separately. The polarization beam splitter can be incorporated into the optical performance monitor before, within, or after one of the stages of the optical performance monitor.

In various embodiments, the first stage can be input with the multiplexed optical signal (or a portion thereof), and additionally or alternatively with other control signals, calibration signals, or other types of optical signals. The calibration signals can be used to calibrate the optical performance monitor, for example by providing a known signal for use in calibration. The control signals can be passed to a DSP via the optical performance monitor and interpreted thereby as control information.

In various embodiments, the DSP is configured to receive, process and map the output of the optical performance monitor. Such output can be regarded as spectral information, i.e. indicative of signal strength of the input signal at various frequencies or frequency bands. The DSP can be configured to read the appropriate output port of the AWG at the appropriate time(s) and map the results to the appropriate frequency or frequency band. This may depend at least in part on the operation of the AWG and the state of the second-stage switch which selects which MZDI is in use at a given time. The DSP may be programmed with the appropriate information to perform mappings of AWG output ports to frequencies or frequency bands. Accordingly, the optical performance monitor may be configured to interpret third-stage output as spectral components of the multiplexed optical signal, according to operating behaviour of the optical performance monitor.

Embodiments of the present invention comprise a controller configured to perform operations as described herein, such as tuning, scanning or sweeping over frequencies, etc. The controller may determine a desired part of the frequency spectrum to be measured at high resolution and adjust the first stage to perform high resolution measurement for the desired part of the spectrum. The controller may be configured to determine a desired set of frequencies to be measured by the optical performance monitor. The controller may further be configured to control the first stage to generate plural instances of the fine filtered optical signal successively over time, said plural instances covering the desired set of frequencies. The controller can include electronic and/or photonic components operatively coupled to different parts of the optical performance monitor. The controller can include digital or analog electronic components, a microcontroller, a microprocessor operatively coupled to memory, a field programmable gate array, an application specific integrated circuit, or a combination thereof. In some embodiments, the first stage has a tunable resolution, also referred to as an adjustable fine filtering bandwidth. The controller can be configured to adjust this bandwidth based on current operating requirements, such as a required resolution or granularity (coarseness or fineness) of frequency scanning results. The controller can cause the optical performance monitor to perform measurements at a desired frequency resolution, by adjusting the tunable resolution. The resolution can be adjusted based on input to the controller, which in turn may be based on measurement requirements. The controller can cause the monitor operate on a specified optical signal, or a specified portion (in frequency) of an optical signal. Output of the monitoring can be received by the controller and measurements can be provided by the controller. The measurements correspond to the processed or unprocessed output.

In some embodiments, the optical performance monitor may include multiple monitoring components configured for monitoring a different band of frequencies. Different bands of frequencies may correspond to different wave division multiplexing (WDM) channels, for example, such as C, L and O band channels. This allows the optical performance monitor to perform measurements across multiple frequency bands. Equivalently, multiple, differently configured optical performance monitors can be operated in parallel.

Embodiments of the present invention can be fabricated using different technologies such as silicon photonics, silicon nitride, or other CMOS compatible technologies. The different stages can be fabricated at least in part using such technologies. All stages can be fabricated using the same technology, or different stages can be fabricated using different technologies and optically coupled together. For example, a laser may be fabricated in a technology not compatible with CMOS (for DSP) such as Indium phosphite, Litium niobie, etc. The AWG can be based on Silicon Nitride. Typically the laser (for example provided and used for calibration) is a separate off-the-chip module for the CMOS platform. Depending on the design and implemetation, each component in the three stage can be provided primarily in a particular technology.

As described above, the second stage may include a MZDI structure, or multiple MZDI structures operating in parallel. Additionally or alternatively, the second stage may include other types of optical power splitters configured to provide multiple outputs to the AWG. Such power splitters may consist of or include a variable power splitter, a variable optical attenuator, a directional coupler, or a combination thereof. The power splitters may be configured to divide an optical input signal into two or more portions in accordance with a predetermined or controllable allocation. For example, the power splitters may direct a first controllable fraction of the input signal (less than, equal to or greater than half) to a first output and direct the remaining portion of the input signal to a second output. The second stage is not necessarily limited to dividing its optical input signal into two parts. Rather, the second stage may be configured to divide its optical input signal into three or more parts.

An aspect of the disclosure includes an optical performance monitor. The optical performance monitor includes a first stage configured to receive a multiplexed optical signal, the first stage being tunable, the first stage periodically filtering the multiplexed optical signal to produce a fine filtered optical signal. The optical performance monitor further includes a second stage, coupled to the first stage, the second stage having a first transfer function, the second stage receiving the fine filtered optical signal, the second stage producing a plurality of phase-delayed optical signal pairs. The optical performance monitor further includes a third stage, coupled to the second stage, the third stage having a second transfer function, the third stage receiving the plurality of phase-delayed optical signal pairs, the third stage demultiplexing the plurality of phase-delayed optical signal pairs to produce a plurality of demultiplexed optical signals, the combination of the first transfer function and the second transfer function being flatter over the optical channel than the second transfer function. In some embodiments the first stage comprises a tunable micro ring resonator. In some embodiments the third stage includes an arrayed waveguide grating (AWG). In some embodiments the AWG is an multi input-multi output AWG. It is noted that the term "first transfer function" refers to the second-stage transfer function, and the term "second transfer function" refers to the third-stage transfer function.

For clarity, although aspects of the present invention specify producing a plurality of (e.g. phase-delayed) optical signal pairs, it should be understood that, in various embodiments, only one of the plurality of optical signal pairs is produced at a given time. The other optical signal pairs are produced at different times, for example in response to operation of a switch. In other embodiments, only one optical signal pair is produced and the switch is omitted. A phase-delayed or interfered optical signal pair may refer to a pair of optical signals, at least one of which is substantially a phase-delayed and lower-amplitude version of an input signal. This may be achieved for example by equally or unequally dividing the input signal into two portions. Such division can be achieved using an MZDI structure or another structure.

Accordingly, embodiments of the invention may include a second stage which produces a pair of (e.g. interfered) optical signals from an input signal, wherein the pair of optical signals may be substantially lower-amplitude (or even higher-amplitude if the signals are actively boosted) copies of the input signal. The amplitudes may be specified or tuned to provide the desirably flat transfer function of the second and third stages in combination.

In some embodiments the second stage includes a switch receiving the fine filtered optical signal, the switch having two outputs. The second stage further includes a first Mach-Zehnder delay interferometer coupled to a first of the two outputs of the switch, a transfer function of the first Mach-Zehnder delay interferometer defining the first transfer function over a first half of the period, the first Mach-Zehnder delay interferometer producing a first of the plurality of phase-delayed optical signal pairs. The second stage further includes a second Mach-Zehnder delay interferometer coupled to a second of the two outputs of the switch, a transfer function of the second Mach-Zehnder delay interferometer defining the first transfer function over a second half of the period, the second Mach-Zehnder delay interferometer producing a second of the plurality of phase-delayed optical signal pairs.

An aspect of the disclosure includes a method of monitoring the performance of an optical signal. The method includes receiving, by a first stage, a multiplexed optical signal, the first stage being tunable. The method further includes periodically filtering over an optical channel, by tuning the first stage over a period, the multiplexed optical signal to produce a fine filtered optical signal. The method further includes receiving, by a second stage, the fine filtered optical signal. The method further includes transforming by a first transfer function, by the second stage, to produce a plurality of phase-delayed optical signal pairs. The method further includes receiving, by a third stage, the plurality of phase-delayed optical signal pairs. The method further includes transforming by a second transfer function, by the third stage, the plurality of phase-delayed signal pairs and demultiplexing the plurality of phase-delayed signal pairs to produce a plurality of demultiplexed optical signals, the combination of the first transfer function and the second transfer function being flatter over the optical channel than the second transfer function. In some embodiments the first stage comprises a tunable micro ring resonator. In some embodiments the third stage includes an arrayed waveguide grating (AWG). In some embodiments the AWG is an multi input-multi output AWG.

In some embodiments the transforming by a first transfer function includes receiving the fine filtered optical signal by a switch having two outputs. The transforming further includes switching, during a first half of the period, the fine filtered optical signal to a first Mach-Zehnder delay interferometer, a transfer function of the first Mach-Zehnder delay interferometer defining the first transfer function over the first half of the period, the first Mach-Zehnder delay interferometer producing a first of the plurality of phase-delayed optical signal pairs. The transforming further includes switching, during a second half of the period, the fine filtered optical signal to a second Mach-Zehnder delay interferometer, a transfer function of the second Mach-Zehnder delay interferometer defining the first transfer function over the second half of the period, the second Mach-Zehnder delay interferometer producing a second of the plurality of phase-delayed optical signal pairs. Similarly, if there are more than two MZDIs and a corresponding multi-way switch as in FIG. 8, different MZDIs can define different portions of the first transfer functions over different corresponding portions of the period, and the switch can route the fine filtered optical signal to different MZDIs during these different portions of the period.

An aspect of the disclosure includes an optical performance monitor including a tunable micro ring resonator configured to receive a multiplexed optical signal, the tunable micro ring resonator being tunable, to produce a fine filtered optical signal. The optical performance monitor further includes a first Mach-Zehnder delay interferometer coupled to the tunable micro ring resonator, a transfer function of the first Mach-Zehnder delay interferometer defining a first transfer function over a first portion of the period, the first Mach-Zehnder delay interferometer producing a first phase-delayed optical signal pair. The optical performance monitor further includes an multi input-multi output AWG, coupled to the first Mach-Zehnder delay interferometer, the multi input multi output AWG having a second transfer function, the multi input-multi output AWG receiving the first phase-delayed optical signal pair, the multi input-multi output AWG demultiplexing the first phase-delayed optical signal pair to produce a plurality of demultiplexed optical signals, the combination of the first transfer function and the second transfer function being flatter over the optical channel than the second transfer function.

In some embodiments the optical performance monitor further includes a switch, coupled between the tunable micro ring resonator and the first Mach-Zehnder delay interferometer, the switch having two outputs, the first Mach-Zehnder delay interferometer coupled to one of the two outputs. In some embodiments the optical performance monitor further includes a second Mach-Zehnder delay interferometer coupled to a second of the two outputs, a transfer function of the second Mach-Zehnder delay interferometer defining a second portion transfer function over a second portion of the period, the second Mach-Zehnder delay interferometer producing a second phase-delayed optical signal pair, the second portion transfer function defining the first transfer function over the second portion of the period.

An aspect of the disclosure includes a method of monitoring the performance of an optical signal. The method includes receiving, by a micro ring resonator, a multiplexed optical signal, the micro ring resonator being tunable over a period. The method further includes periodically filtering over an optical channel, by tuning the micro ring resonator over the period, the multiplexed optical signal to produce a fine filtered optical signal. The method further includes receiving the fine filtered optical signal by a switch having two outputs. The method further includes switching, during a first half of the period, the fine filtered optical signal to a first Mach-Zehnder delay interferometer, a transfer function of the first Mach-Zehnder delay interferometer defining a first transfer function over the first half of the period, the first Mach-Zehnder delay interferometer producing a first phase-delayed optical signal pair. The method further includes switching, during a second half of the period, the fine filtered optical signal to a second Mach-Zehnder delay interferometer, a transfer function of the second Mach-Zehnder delay interferometer defining the first transfer function over the second half of the period, the second Mach-Zehnder delay interferometer producing a second phase-delayed optical signal pair. The method further includes receiving, by an multi input-multi output AWG, the first phase-delayed optical signal pair and the second phase-delayed optical signal pair. The method further includes transforming by a second transfer function, by the multi input-multi output AWG, the first phase-delayed optical signal pair and the second phase-delayed optical signal pair and demultiplexing the first phase-delayed optical signal pair and the second phase-delayed optical signal pair to produce a plurality of demultiplexed optical signals, the combination of the first transfer function and the second transfer function being flatter over the optical channel than the second transfer function.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. An optical performance monitor comprising:
   a first stage configured to receive a multiplexed optical signal, the first stage being configured to perform tunable frequency-periodic filtering on the multiplexed optical signal to produce a fine filtered optical signal;
   a second stage coupled to the first stage and configured to receive the fine filtered optical signal, the second stage configured to produce a pair of optical signals based on the fine filtered optical signal; and
   a third stage coupled to the second stage and configured to receive the pair of optical signals, the third stage configured to demultiplex the pair of optical signals to produce a plurality of demultiplexed optical signals;
   wherein the second stage has a second-stage transfer function, the third stage has a third-stage transfer function, and wherein, over a predetermined operating frequency range, a combination of the second-stage transfer function and the third-stage transfer function varies less than the third-stage transfer function.

2. The optical performance monitor of claim 1, wherein the first stage is configured to pass portions of the multiplexed optical signal falling within a spaced-apart set of frequency bands, wherein center frequencies of the spaced-apart set of frequency bands are adjustable over a predetermined free spectral range by tuning of the first stage, and wherein the predetermined operating frequency range spans the free spectral range.

3. The optical performance monitor of claim 1, wherein the second stage is configured to produce the pair of optical signals as copies of the fine filtered optical signal with specified amplitudes.

4. The optical performance monitor of claim 1, wherein the second stage comprises a Mach-Zehnder delay interferometer configured to produce the pair of optical signals.

5. The optical performance monitor of claim 1, wherein the second stage comprises:
   a switch configured to receive the fine filtered optical signal, the switch having two outputs and configured to selectably direct the fine filtered optical signal to either one of the two outputs;
   a first Mach-Zehnder delay interferometer (MZDI) coupled to a first output of the two outputs and configured to produce the pair of optical signals when the switch directs the fine filtered optical signal to the first output; and
   a second Mach-Zehnder delay interferometer (MZDI) coupled to a second output of the two outputs and configured to produce the pair of optical signals when the switch directs the fine filtered optical signal to the second output.

6. The optical performance monitor of claim 5, wherein: the second stage has a second-stage transfer function, the third stage has a third-stage transfer function, and wherein, over a predetermined operating frequency range, a combination of the second-stage transfer function and the third-stage transfer function varies less than the third-stage transfer function; and the second stage is configured to provide the second-stage transfer function by directing the fine filtered optical signal through the first MZDI when the fine filtered optical signal falls within a first portion of the operating frequency range, and further by directing the fine filtered optical signal through the second MZDI when the fine filtered optical signal falls within a second portion of the operating frequency range.

7. The optical performance monitor of claim 1, wherein the first stage comprises a tunable micro ring resonator.

8. The optical performance monitor of claim 1, wherein the third stage comprises an arrayed waveguide grating (AWG).

9. The optical performance monitor of claim 8, wherein the AWG is a multi input-multi output AWG.

10. The optical performance monitor of claim 8, further comprising one or more calibration components operatively coupled to one or more input ports, output ports, or both, of the AWG.

11. The optical performance monitor of claim 1, further comprising a polarization beam splitter configured to separate the multiplexed optical signal into multiple polarized components to be monitored separately.

12. The optical performance monitor of claim 1, further comprising a controller configured to: determine a desired set of frequencies to be measured by the optical performance monitor; and control the first stage to generate plural instances of the fine filtered optical signal successively over time, said plural instances covering the desired set of frequencies.

13. The optical performance monitor of claim 1, wherein the first stage is further controllable to adjust a bandwidth of the fine filtered optical signal, the optical performance monitor, further comprising a controller configured to adjust said bandwidth of the fine filtered optical signal based on current operating requirements.

14. The optical performance monitor of claim 1, wherein the first stage, the second stage and the third stage collectively form a first monitoring component configured for monitoring optical signals within a first frequency band, the optical performance monitor further comprising one or more additional monitoring components each configured for monitoring optical signals within one or more additional frequency bands.

15. The optical performance monitor of claim 1, wherein one or more of the first stage, the second stage and the third stage are fabricated in silicon photonics, silicon nitride, or another CMOS compatible technology.

16. The optical performance monitor of claim 1, wherein at least two components of one or more of the first stage, the second stage and the third stage are fabricated using a different technology selected from: silicon photonics, silicon nitride, or another CMOS compatible technology, said at least two components being indirectly or directly optically coupled together.

17. The optical performance monitor of claim 1, wherein the second stage comprises an optical power splitter configured to provide the pair of optical signals.

18. The optical performance monitor of claim 17, wherein the optical power splitter comprises one or more of: a variable power splitter, a variable optical attenuator, or a directional coupler.

19. The optical performance monitor of claim 1, further configured to receive, at the first stage along with the multiplexed optical signal, one or more optical control signals or calibration signals, and to process the one or more optical control signals or calibration signals.

20. The optical performance monitor of claim 1, further comprising a signal processing component configured to receive output of the third stage, and to interpret said output as spectral components of the multiplexed optical signal according to operating behaviour of the optical performance monitor.

21. A controller configured to:
receive an indication of a portion of a specified optical signal to monitor;
cause the optical performance monitor of claim 1 to operate on the specified optical signal as the received multiplexed signal; and
based on output of the optical performance monitor operating on the specified optical signal, provide one or more measurements of the optical signal.

22. The controller of claim 21, further configured to: receive an indication of a specified frequency resolution at which to measure the specified optical signal; and cause the optical performance monitor of claim 1 to perform frequency-based measurements of the specified optical signal at the specified frequency resolution.

23. A system comprising:
a first optical performance monitor;
a second optical performance monitor; and
a polarization beam splitter configured to: split an input optical signal into a first portion and a second portion based on polarization; provide the first portion to the first optical performance monitor; and provide the second portion to the second optical performance monitor;
wherein the first optical performance monitor and the second optical performance monitor each comprise:
a first stage configured to receive a multiplexed optical signal, the first stage being configured to perform tunable frequency-periodic filtering on the multiplexed optical signal to produce a fine filtered optical signal;
a second stage coupled to the first stage and configured to receive the fine filtered optical signal, the second stage configured to produce a pair of optical signals based on the fine filtered optical signal; and
a third stage coupled to the second stage and configured to receive the pair of optical signals, the third stage configured to demultiplex the pair of optical signals to produce a plurality of demultiplexed optical signals.

24. The system of claim 23, wherein the second stage of one or both of the first optical performance monitor and the second optical performance monitor is configured to produce the pair of optical signals as copies of the fine filtered optical signal with specified amplitudes.

25. A method of monitoring performance of an optical signal, the method comprising:
receiving, by a first stage, a multiplexed optical signal, the first stage being tunable;
performing frequency-periodic filtering of the multiplexed optical signal, by tuning the first stage, to produce a fine filtered optical signal;
receiving, by a second stage, the fine filtered optical signal;
producing, by the second stage, a pair of optical signals based on the fine filtered optical signal;
receiving, by a third stage, the pair of optical signals; and
demultiplexing, by the third stage, the pair of optical signals to produce a plurality of demultiplexed optical signals;
wherein the second stage has a second-stage transfer function, the third stage has a third-stage transfer function, and wherein, over a predetermined operating frequency range, a combination of the second-stage transfer function and the third-stage transfer function varies less than the third-stage transfer function.

26. The method of claim 25, further comprising: determining a desired set of frequencies to be measured for optical signal performance monitoring; and controlling the first stage to generate plural instances of the fine filtered optical signal successively over time, said plural instances covering the desired set of frequencies.

27. The method of claim 25, wherein the second stage is configured to produce the pair of optical signals as copies of the fine filtered optical signal with specified amplitudes.

* * * * *